(12) United States Patent
Himmelmann

(10) Patent No.: US 8,058,757 B2
(45) Date of Patent: Nov. 15, 2011

(54) ELECTRIC MOTOR WITH PASSIVE INTEGRAL BRAKE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/637,817

(22) Filed: Dec. 15, 2009

(65) Prior Publication Data

US 2011/0140556 A1    Jun. 16, 2011

(51) Int. Cl.
*H02K 7/102* (2006.01)
(52) U.S. Cl. .............. 310/77; 310/93; 188/67; 188/164; 188/171
(58) Field of Classification Search .............. 310/77, 310/93; 188/67, 156–159, 164, 171, 325
See application file for complete search history.

(56) References Cited

U.S. PATENT DOCUMENTS

| | | | |
|---|---|---|---|
| 2,052,200 A * | 8/1936 | Logan, Jr. ................ | 188/156 |
| 3,432,703 A * | 3/1969 | Sheps et al. ................ | 310/50 |
| 6,260,667 B1 | 7/2001 | Sugden | |
| 7,138,737 B2 * | 11/2006 | Habele ............... | 310/77 |
| 7,385,332 B2 | 6/2008 | Himmelmann et al. | |

| | | |
|---|---|---|
| 2005/0179330 A1 | 8/2005 | Habele |
| 2008/0076614 A1 | 3/2008 | Himmelmann |
| 2008/0197730 A1 | 8/2008 | Himmelmann et al. |

FOREIGN PATENT DOCUMENTS

| | | |
|---|---|---|
| BE | 653879 | 10/1964 |
| DE | 10217667 A | 1/2003 |
| DE | 10314886 A1 | 11/2004 |
| JP | 57013943 | 1/1982 |

OTHER PUBLICATIONS

European Search Report dated May 19, 2011 for Application No. 10252120.0-1252.

* cited by examiner

*Primary Examiner* — Quyen Leung
*Assistant Examiner* — David W. Scheuermann
(74) *Attorney, Agent, or Firm* — Cantor Colburn LLP

(57) ABSTRACT

An electric motor (102) with passive integral brake (104) includes a stator (204) with one or more magnetic field controllable coils (206) and a rotor (208) with a rotor shaft (210) positioned within an inner diameter (212) of the stator (204). The rotor (208) is operable to rotate about a longitudinal axis (214) of the rotor shaft (210). The electric motor (102) with passive integral brake (104) also includes a brake shoe (302) positioned within the inner diameter (212) of the stator (204) along the longitudinal axis (214) of the rotor shaft (210). The brake shoe (302) is operable to apply a braking force to the rotor shaft (210) and remove the braking force from the rotor shaft (210) responsive to a magnetic field strength produced by the one or more magnetic field controllable coils (206). One or more springs (220) passively apply the braking force.

12 Claims, 3 Drawing Sheets

ELECTRIC MOTOR WITH PASSIVE INTEGRAL BRAKE

BACKGROUND OF THE INVENTION

The subject matter disclosed herein generally relates to electro-mechanical systems, and more particularly to an electric motor with a passive integral brake.

Certain applications for electro-mechanical actuators require that an electro-mechanical actuator hold a load in a stationary position after electrical power to operate the electro-mechanical actuator has been removed. One approach to holding a stationary position absent electrical power is the use of a friction device that drags at all times. Examples of friction devices include friction pads, ball ramps, heavily pre-loaded rolling element bearings, and skewed roller bearings. The ever-present drag produced by these friction devices typically requires over sizing of the drive motor and reduces actuator efficiency.

Using an actively controlled brake can alleviate the inefficiency associated with a continuously dragging brake; however, the actively controlled brake adds complexity by requiring a control system for operation. Some actively controlled brakes use electrical power to engage the brake, while others use additional electrical power to release the brake. The inclusion of an actively controlled brake in an electro-mechanical actuation system also increases the overall size and weight of the system, and may demand additional electrical power to set and release the actively controlled brake.

BRIEF DESCRIPTION OF THE INVENTION

According to one aspect of the invention, an electric motor with passive integral brake is provided. The electric motor with passive integral brake includes a stator with one or more magnetic field controllable coils and a rotor with a rotor shaft positioned within an inner diameter of the stator. The rotor is operable to rotate about a longitudinal axis of the rotor shaft. The electric motor with passive integral brake also includes a brake shoe positioned within the inner diameter of the stator along the longitudinal axis of the rotor shaft. The brake shoe is operable to apply a braking force to the rotor shaft and remove the braking force from the rotor shaft responsive to a magnetic field strength produced by the one or more magnetic field controllable coils.

According to a further aspect of the invention, an electro-mechanical system is provided. The electro-mechanical system includes a mechanical actuator, a gear train coupled to the mechanical actuator, and an electric motor with passive integral brake coupled to the gear train. The electric motor operably provides a mechanical force through the gear train to apply and stop mechanical movement of the mechanical actuator, where the passive integral brake is positioned within the electric motor and is magnetically controlled.

According to yet another aspect of the invention, a method for producing passive integral braking in an electric motor is provided. The method includes positioning a rotor with a rotor shaft within an inner diameter of a stator. The stator includes one or more magnetic field controllable coils. The rotor is operable to rotate about a longitudinal axis of the rotor shaft. The method further includes positioning a brake shoe within the inner diameter of the stator along the longitudinal axis of the rotor shaft. The method also includes applying a braking force between the brake shoe and the rotor shaft responsive to a magnetic field strength produced by the one or more magnetic field controllable coils being below a threshold value. The method additionally includes removing the braking force between the brake shoe and the rotor shaft responsive to the magnetic field strength being above the threshold value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The invention as described in greater detail herein provides a passive, spring set, brake that is integrated into an electric motor assembly. The electric motor assembly may be integrated with a mechanical actuator to form an electro-mechanical actuator with a passive integral brake. The passive integral brake prohibits rotation of a rotor in the electric motor when electrical power is removed from the electric motor.

Figure 1:
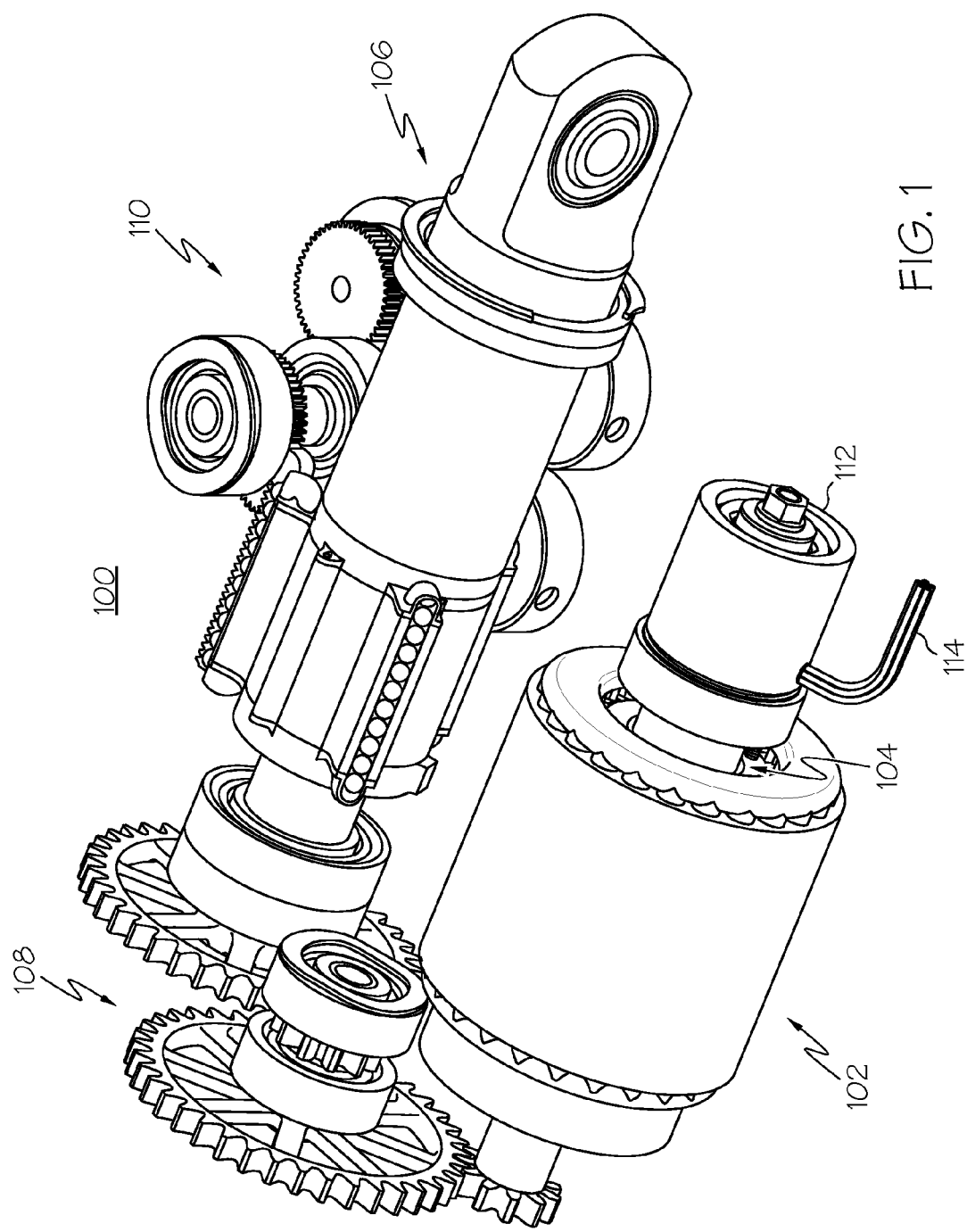
FIG. 1 illustrates an exemplary embodiment of an electro-mechanical system including an electric motor with passive integral brake.

FIG. 1 illustrates an exemplary embodiment of an electro-mechanical system 100 including an electric motor 102 with passive integral brake 104. The electro-mechanical system 100 also includes a mechanical actuator 106 and a gear train 108 coupled to the mechanical actuator 106. The electro-mechanical system 100 may further include a position feedback apparatus 110 to enable closed-loop control of the mechanical actuator 106. The electric motor 102 is also coupled to the gear train 108, operably providing a mechanical force through the gear train 108 to apply and stop mechanical movement of the mechanical actuator 106. The passive integral brake 104 is positioned within the electric motor 102 and is magnetically controlled. A resolver 112 can be used to provide motor position feedback and control commutation in the electric motor 102 through electrical connector 114. The electro-mechanical system 100 may be packaged in a housing to form an integrated electro-mechanical actuator capable of holding a load in a stationary position after electrical power to operate the electro-mechanical actuator has been removed.

Figure 2:
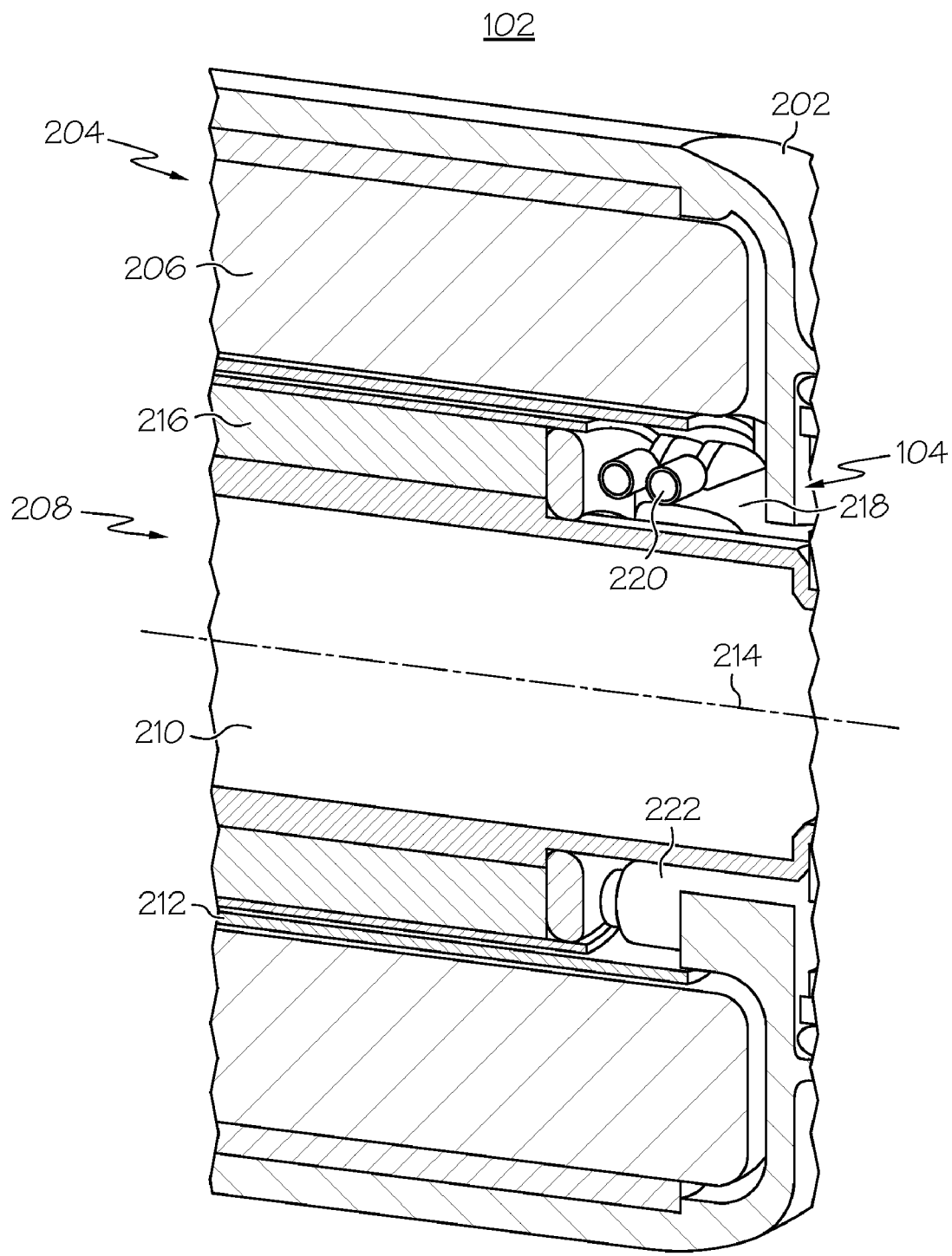
FIG. 2 is side cutaway view of the electric motor with passive integral brake of FIG. 1.

FIG. 2 is side cutaway view of the electric motor 102 with passive integral brake 104 of FIG. 1. Within a motor assembly housing 202, the electric motor 102 includes a stator 204 with one or more magnetic field controllable coils 206. The electric motor 102 also includes a rotor 208 with a rotor shaft 210 positioned within an inner diameter 212 of the stator 204. The rotor 208 is operable to rotate about a longitudinal axis 214 of the rotor shaft 210. The rotor may also include a permanent magnet 216 to interact with a magnetic field produced by the one or more magnetic field controllable coils 206, resulting in the rotor shaft 210 rotating about the longitudinal axis 214.

The passive integral brake 104 includes one or more brake shoes 218 positioned within the inner diameter 212 of the stator 204 along the longitudinal axis 214 of the rotor shaft 210. The one or more brake shoes 218 are operable to apply a braking force to the rotor shaft 210 and remove the braking force from the rotor shaft 210 responsive to a magnetic field strength produced by the one or more magnetic field controllable coils 206. One or more springs 220 coupled to the one or more brake shoes 218 passively apply the braking force between the one or more brake shoes 218 and the rotor shaft 210 absent the magnetic field strength exceeding a threshold level to attract the one or more brake shoes 218 to the inner diameter 212 of the stator 204. The one or more brake shoes 218 are coupled to one or more pivots 222 to control movement of the one or more brake shoes 218.

When sufficient magnetic force exists between the one or more brake shoes 218 and the one or more magnetic field controllable coils 206 such that the magnetic field strength is above the threshold level, the compressive force of the one or more springs 220 is overcome, and the one or more brake shoes 218 rotate about the one or more pivots 222 toward the inner diameter 212 of the stator 204, thereby releasing the braking force from the rotor shaft 210. When the magnetic field strength is below the threshold level, the compressive force of the one or more springs 220 exceeds the magnetic force between the one or more brake shoes 218 and the one or more magnetic field controllable coils 206, resulting in the one or more brake shoes 218 rotating about the one or more pivots 222 towards the rotor shaft 210 and applying the braking force.

In exemplary embodiments, the one or more brake shoes 218 are each constructed of a plurality of laminated ferromagnetic layers. Using laminated ferromagnetic layers, such as steal laminations, rather than solid body construction may better mitigate heating issues to prevent overheating of the one or more brake shoes 218. The ferromagnetic material in the one or more brake shoes 218 enables the one or more brake shoes 218 to be magnetically attracted to the magnetic field produced by the one or more magnetic field controllable coils 206. In contrast, the one or more springs 220 are non-ferromagnetic to prevent the one or more springs 220 from being attracted to the one or more magnetic field controllable coils 206.

Figure 3:
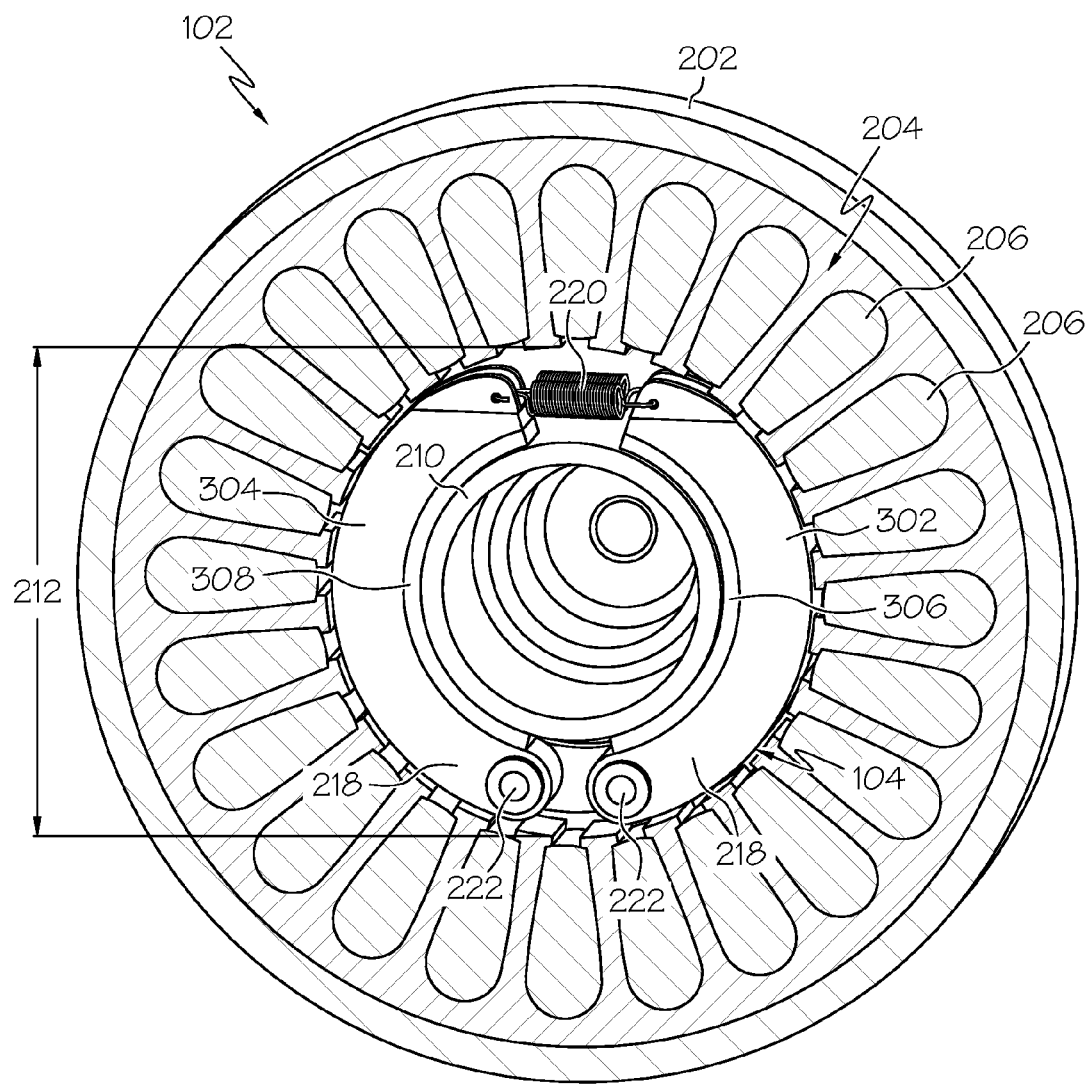
FIG. 3 is front cutaway view of the electric motor with passive integral brake of FIGS. 1 and 2.

FIG. 3 is front cutaway view of the electric motor 102 with passive integral brake 104 of FIGS. 1 and 2. FIG. 3 again illustrates the stator 204 with one or more magnetic field controllable coils 206 within the motor assembly housing 202. FIG. 3 also depicts the rotor shaft 210 positioned within the inner diameter 212 of the stator 204, and the one or more brake shoes 218 coupled to one or more springs 220 and one or more pivots 222. In the example of FIG. 3, the one or more brake shoes 218 are depicted as a first brake shoe 302 and a second brake shoe 304. Friction material 306 and 308 on the first and second brake shoes 302 and 304 apply the braking force to the rotor shaft 210 when the one or more springs 220 are compressed.

By positioning the rotor 208 with rotor shaft 210 within the inner diameter 212 of stator 204, and positioning the first and second brake shoes 302 and 304 within the inner diameter 212 of the stator 204 along the longitudinal axis 214 of the rotor shaft 210, the braking force can be passively applied between the first and second brake shoes 302 and 304 and the rotor shaft 210 responsive to the magnetic field strength produced by the one or more magnetic field controllable coils 206 being below a threshold value. The braking force between the first and second brake shoes 302 and 304 and the rotor shaft 210 can be removed responsive to the magnetic field strength being above the threshold value, as the one or more brake shoes 218 are attracted to the inner diameter 212 of the stator 206.

Although the example of FIG. 3 depicts the first and second brake shoes 302 and 304 with two separate pivots 222 and coupled by two springs 220, it will be understood that other variations are included within the scope of the invention. For example, a single brake shoe 302 or 304 can be coupled to a single spring 220, where the single spring 220 is anchored to the stator 206. As another alternative, the first and second brake shoes 302 and 304 can be coupled to a single pivot 222. Multiple instances of the passive integral brake 104 can be included within the electric motor 102 for redundancy, staged braking, and/or load distribution.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric motor with passive integral brake, comprising:
    a stator comprising one or more magnetic field controllable coils;
    a rotor comprising a rotor shaft positioned within an inner diameter of the stator, the rotor operable to rotate about a longitudinal axis of the rotor shaft; and
    a brake shoe having a friction material thereon, the brake shoe positioned within the inner diameter of the stator along the longitudinal axis of the rotor shaft, the brake shoe operable to apply a braking force to the rotor shaft through the friction material and remove the braking force from the rotor shaft responsive to a magnetic field strength produced by the one or more magnetic field controllable coils;
    wherein the entire brake shoe is positioned within the inner diameter of the stator between the stator and the rotor shaft; and wherein
    one or more springs coupled to the brake shoe passively applying the braking force between the brake shoe and the rotor shaft absent the magnetic field strength exceeding a threshold level to attract the brake shoe to the inner diameter of the stator; and wherein
    a second brake shoe separate from and positioned opposite the brake shoe across the rotor shaft, the second brake shoe positioned within the inner diameter of the stator along the longitudinal axis of the rotor shaft, wherein the brake shoe and the second brake shoe are coupled to one or more pivots.

2. The electric motor with passive integral brake of claim 1 wherein the brake shoe and the second brake shoe are comprised of a plurality of laminated ferromagnetic layers.

3. The electric motor with passive integral brake of claim 1 wherein the brake shoe and the second brake shoe are further coupled together by the one or more springs.

4. The electric motor with passive integral brake of claim 3 wherein the one or more springs are non-ferromagnetic.

5. An electro-mechanical system comprising:
a mechanical actuator;
a gear train coupled to the mechanical actuator; and
an electric motor with passive integral brake coupled to the gear train, the electric motor operably providing a mechanical force through the gear train to apply and stop mechanical movement of the mechanical actuator, wherein the passive integral brake is positioned within the electric motor and is magnetically controlled;
wherein the electric motor with passive integral brake comprises:
a stator comprising one or more magnetic field controllable coils;
a rotor comprising a rotor shaft positioned within an inner diameter of the stator, the rotor operable to rotate about a longitudinal axis of the rotor shaft; and
a brake shoe having a friction material thereon, the brake shoe positioned within the inner diameter of the stator along the longitudinal axis of the rotor shaft, the brake shoe operable to apply a braking force through the friction material to the rotor shaft and remove the braking force from the rotor shaft responsive to a magnetic field strength produced by the one or more magnetic field controllable coils:
wherein the entire brake shoe is positioned within the inner diameter of the stator between the stator and the rotor shaft; and wherein
one or more springs coupled to the brake shoe passively applying the braking force between the brake shoe and the rotor shaft absent the magnetic field strength exceeding a threshold level to attract the brake shoe to the inner diameter of the stator; and wherein
a second brake shoe separate from and positioned opposite the brake shoe, across the rotor shaft, the second brake shoe positioned within the inner diameter of the stator along the longitudinal axis of the rotor shaft, wherein the brake shoe and the second brake shoe are coupled to one or more pivots.

6. The electro-mechanical system of claim 5 wherein the brake shoe and the second brake shoe are comprised of a plurality of laminated ferromagnetic layers.

7. The electro-mechanical system of claim 5 wherein the brake shoe and the second brake shoe are further coupled together by the one or more springs.

8. The electro-mechanical system of claim 7 wherein the one or more springs are non-ferromagnetic.

9. A method for passive integral braking in an electric motor, comprising:
positioning a rotor comprised of a rotor shaft within an inner diameter of a stator the stator comprising one or more magnetic field controllable coils, and the rotor operable to rotate about a longitudinal axis of the rotor shaft;
positioning a brake shoe having a friction material thereon within the inner diameter of the stator along the longitudinal axis of the rotor shaft, wherein the entire brake shoe is positioned within the inner diameter of the stator between the stator and the rotor shaft;
applying a braking force through the friction material between the brake shoe and the rotor shaft responsive to a magnetic field strength produced by the one or more magnetic field controllable coils being below a threshold value; and
removing the braking force between the brake shoe and the rotor shaft responsive to the magnetic field strength being above the threshold value; and
coupling one or more springs to the brake shoe the one or more springs passively applying the braking force between the brake shoe) and the rotor shaft responsive to the magnetic field strength being below the threshold value, wherein the brake shoe is attracted to the inner diameter of the stator responsive to the magnetic field strength being above the threshold value; and
positioning a second brake shoe within the inner diameter of the stator along the longitudinal axis of the rotor shaft, the second brake shoe separate from and positioned opposite the brake shoe across the rotor shaft; and
coupling the brake shoe and the second brake shoe to one or more pivots.

10. The method of claim 9 wherein the brake shoe and the second brake shoe are comprised of a plurality of laminated ferromagnetic layers.

11. The method of claim 9 further comprising:
coupling the brake shoe and the second brake shoe together by the one or more springs.

12. The method of claim 11 wherein the one or more springs are non-ferromagnetic.

* * * * *